United States Patent
Montgomery et al.

(10) Patent No.: US 7,268,727 B2
(45) Date of Patent: Sep. 11, 2007

(54) METHOD AND APPARATUS FOR IMPROVED POSITION, VELOCITY, ORIENTATION OR ANGULAR RATE SENSOR

(76) Inventors: Paul Yalden Montgomery, 324 Chester St., Menlo Park, CA (US) 94025; David Gary Lawrence, 2541 Betlo Ave, Mountain View, CA (US) 94043

(*) Notice: Subject to any disclaimer, the term of this patent is extended or adjusted under 35 U.S.C. 154(b) by 232 days.

(21) Appl. No.: 10/835,699

(22) Filed: Apr. 30, 2004

(65) Prior Publication Data

US 2005/0242991 A1   Nov. 3, 2005

(51) Int. Cl.
*G01S 5/14* (2006.01)
(52) U.S. Cl. .................................. 342/357.14
(58) Field of Classification Search .......... 342/357.01, 342/357.06, 357.12, 357.14; 701/213, 215
See application file for complete search history.

(56) References Cited

U.S. PATENT DOCUMENTS

| | | | |
|---|---|---|---|
| 5,225,839 A * | 7/1993 | Okurowski et al. | 342/174 |
| 5,657,025 A * | 8/1997 | Ebner et al. | 701/300 |
| 5,672,872 A * | 9/1997 | Wu et al. | 250/330 |
| 6,317,688 B1 | 11/2001 | Bruckner et al. | |
| 6,347,264 B2 * | 2/2002 | Nicosia et al. | 701/16 |
| 6,373,432 B1 * | 4/2002 | Rabinowitz et al. | 342/357.16 |
| 6,573,486 B1 | 6/2003 | Ratkovic et al. | |
| 6,581,465 B1 | 6/2003 | Waters et al. | |
| 6,694,260 B1 | 2/2004 | Rekow | |
| 6,853,909 B2 * | 2/2005 | Scherzinger | 701/207 |
| 2002/0120400 A1 * | 8/2002 | Lin | 701/214 |
| 2002/0143491 A1 * | 10/2002 | Scherzinger | 702/160 |
| 2004/0236509 A1 | 11/2004 | Jeerage et al. | |
| 2005/0137799 A1 * | 6/2005 | Alban et al. | 701/213 |

* cited by examiner

*Primary Examiner*—Dao L. Phan (57) ABSTRACT

A global navigation satellite system (GNSS) receiver system includes a processing unit; and one or more antenna units for receiving GNSS signals, each of the antenna units having a phase center; one or more inertial sensor units each positioned substantially adjacent the phase centers; and at least one communication channel between each antenna unit and the processing unit.

83 Claims, 9 Drawing Sheets

METHOD AND APPARATUS FOR IMPROVED POSITION, VELOCITY, ORIENTATION OR ANGULAR RATE SENSOR

BACKGROUND OF THE INVENTION

1. Field of the Invention

The present invention is directed generally to navigation systems and, particularly, to an improved system and method for position, velocity, orientation or angular rate sensing.

2. Description of the Related Art

Global navigation satellite system (GNSS) sensors are used in vehicles such as aircraft to determine vehicle position, velocity, orientation (attitude), and angular rate.

Use of GNSS position sensors to determine vehicle position is well known. GNSS position sensors can also be used to determine a velocity estimate by solving a set of range-rate equations or by smoothing (curve fitting) a set of position measurements.

A GNSS position sensor typically includes an antenna and an RF coaxial cable coupling the antenna to a GNSS signal processing unit. The GNSS antenna generally includes an antenna element and associated filtering and amplification electronics. Position is sensed at the phase center of the antenna (typically close to the geometric center of the antenna element). Typically, GNSS sensing provides bandwidth up to about 10 Hz.

GNSS orientation (attitude) sensors are also known (Orientation of a rigid body in space is defined by three (3) independent parameters. While various specifications of these parameters are possible, heading, pitch and roll are commonly used.).

Figure 1A:
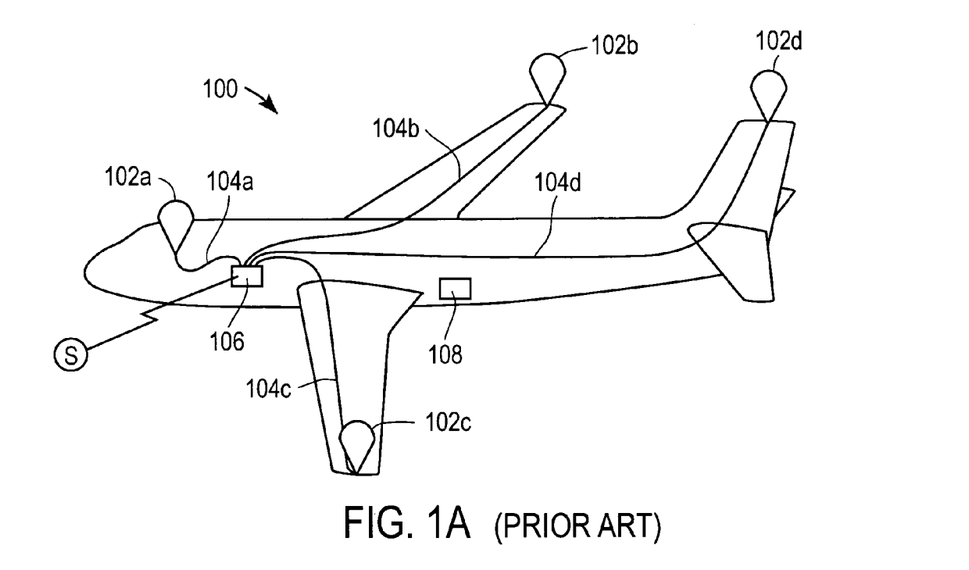
FIG. 1A and FIG. 1B illustrate GNSS and IMU systems according to the prior art.

An exemplary GNSS attitude sensing system 100 is shown in FIG. 1A. Typically, a GNSS attitude sensing system includes a plurality of GNSS antennas 102a-102d coupled via coaxial cables 104a-104d to a GNSS receiver unit 106. The relative positions of the antennas are used to derive a vehicle orientation. In addition, a GNSS attitude sensing system can generate angular rate measurements by solving a set of range-rate equations or by smoothing (curve-fitting) a set of attitude measurements.

Generally, the antennas are attached to the receiver via coaxial cables. To eliminate signal-to-noise (SNR) losses in the coaxial cable, low-noise amplification (LNA) and filtering electronics are placed in the GNSS antennas 102a-102d. The coaxial cable is used to transmit power from the receiver electronics to the antenna LNA electronics and to transmit the bandlimited GNSS signal to the receiver unit 106, where further amplification, filtering and signal processing is performed.

Inertial sensors, such as accelerometers and angular-rate sensors, may be used either alone or in conjunction with GNSS sensors to determine changes in position, velocity, orientation, and angular-rate. Change in position, for example, can be determined by twice integrating a set of accelerometer measurements; change in velocity can be determined by once integrating a set of accelerometer measurements. Similarly, an angular-rate sensor can directly measure angular-rate. The change in orientation can then be derived from integrating the angular rate measurement.

Inertial sensors are typically deployed in an inertial measurement unit (IMU) that houses, for example, an accelerometer, angular-rate, temperature and related sensors, as well as associated power supply, sampling filtering, and computational electronics. The IMU is typically located close to the center of gravity of the vehicle; the mounting orientation within the vehicle is an important installation constraint.

Returning to FIG. 1A, the system 100 includes an exemplary IMU 108 positioned generally at the vehicle's center of gravity and remote from the GNSS receiver electronics 106. In the system shown, the measurements from both the GNSS sensors and the inertial sensors are available for processing. The GNSS measurements can be used to calibrate the inertial instruments over time by updating estimates of inertial sensor parameters at the relatively slow GNSS update rate. However, in situations where the tracking of the GNSS signals is compromised by low SNR, extreme antenna acceleration, destructive multipath or similar interference, latency between the IMU processor and the GNSS processor will generally preclude calibrating in the reverse direction.

Figure 1B:
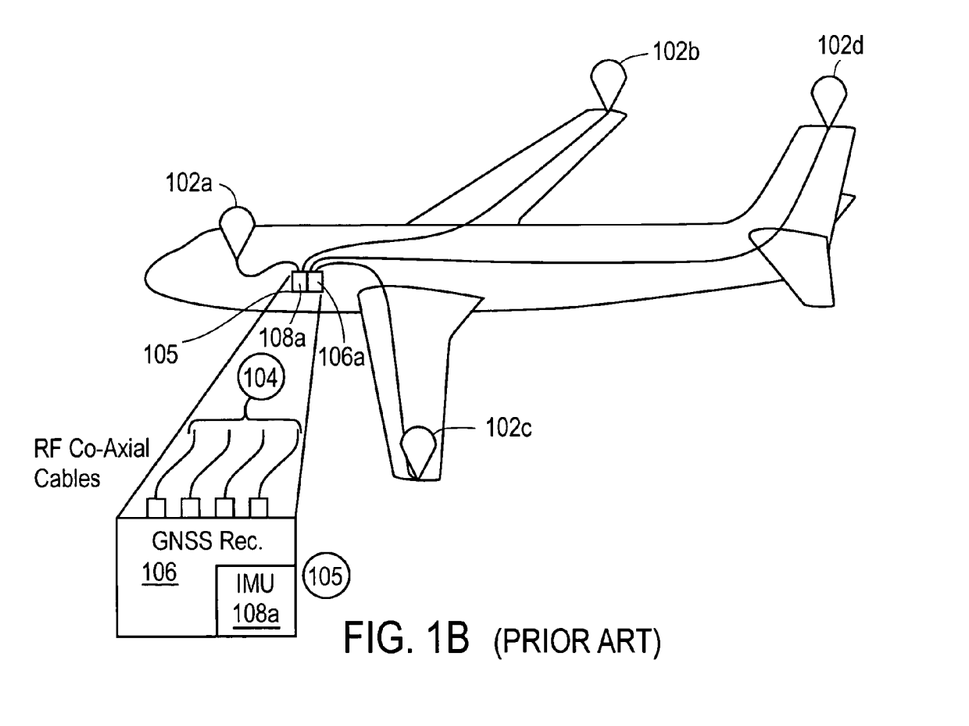

Alternatively, the IMU may be combined with the GNSS receiver electronics in a single enclosure. Such a configuration is shown in FIG. 1B. As shown, a processing unit 105 includes both GNSS receiver electronics 106a and IMU 108a. This topology offers several advantages over the topology of FIG. 1A. These include elimination of the communications harness between the IMU and GNSS receiver unit; reduction in communication latency and complexity; and synchronous sampling of GNSS and inertial measurements, allowing: high bandwidth inertial measurement flow into the GNSS tracking channels; low bandwidth processed GNSS measurements update inertial measurement parameters; and high bandwidth GNSS phase data are available for update of inertial instrument parameters.

However, such a topology also suffers from disadvantages related to the fact that the point at which the inertial sensors reside is physically remote from the phase centers of the antennas. The GNSS receiver 106 senses position (phase information) at the phase centers of its antennas. The IMU samples and integrates its internal sensors at the physical location of the IMU. Because the antennas and the IMU enclosure are physically separated, a projection algorithm must be applied before the measurements can be compared for purpose of complementary filtering. The projection algorithm requires the vectors between the IMU and the antenna phase centers be accurately known. This requirement can be problematic because it mandates an installation calibration procedure that may be complex; the vectors may change over time; and the vectors may change during operation, e.g., due to the structural flexibility of the vehicle, or elements of the vehicle.

SUMMARY OF THE INVENTION

These and other drawbacks in the prior art are overcome in large part by a system and method according to embodiments of the present invention.

A global navigation satellite system (GNSS) receiver system according to an embodiment of the present invention includes a processing unit; and one or more antenna units for receiving GNSS signals, each of the antenna units having a phase center; one or more inertial sensor units each positioned substantially adjacent said phase centers; and at least one communication channel between each antenna unit and said processing unit. In certain embodiments, the processing unit uses data from the one or more antenna units and data from the one or more inertial sensor units to determine at least one of a position, velocity, orientation, or angular rate of the object. In certain embodiments of the invention, the antenna units include a single antenna element, the inertial sensing unit being positioned substantially adjacent the phase center of the antenna element. In other embodiments, the antenna units include a plurality of antenna elements mounted on a substantially rigid substrate, and the inertial sensing unit is positioned substantially adjacent an antenna unit phase center, defined as the geometric mean of the phase centers of the antenna elements. In this context, rigidity of the substrate denotes relative motion between the antenna elements of less than about one hundredth of the highest frequency GNSS carrier wavelength during operation.

An antenna unit for use in a global navigation satellite system (GNSS) receiver according to an embodiment of the present invention includes an integrated inertial sensor unit positioned substantially adjacent a phase center of the antenna unit. In certain embodiments, the phase center of the antenna unit is the phase center of a single antenna element. In other embodiments, the phase center of the antenna unit is the geometric mean (equally weighted centroid) of the phase centers of a plurality of antenna elements.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION OF THE PREFERRED EMBODIMENTS

Figure 2A:
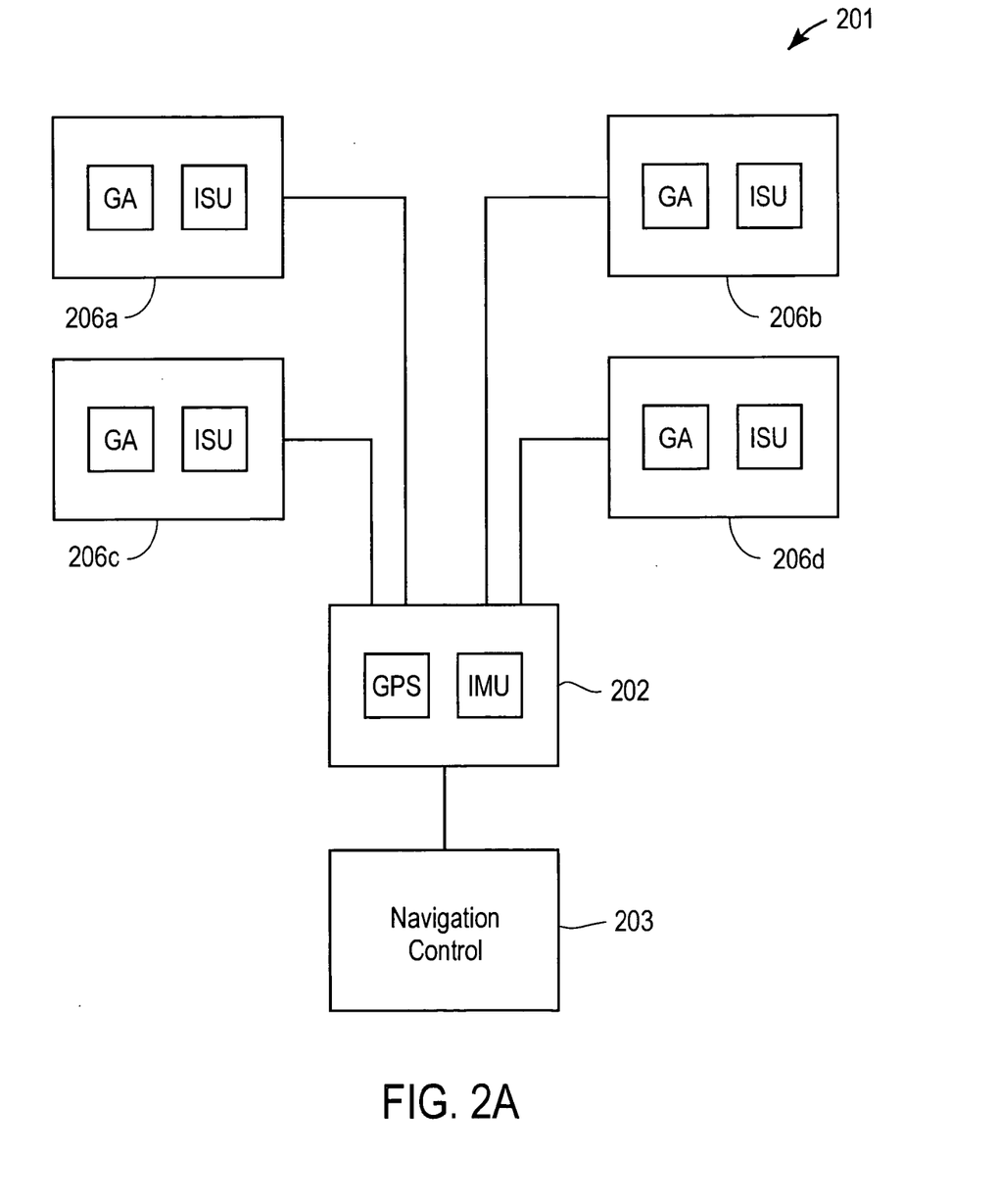
FIG. 2A is a block diagram of an exemplary positioning and navigation system in accordance with an embodiment of the invention.

Turning now to FIG. 2A a block diagram of an exemplary navigation-positioning system 201 in accordance with an embodiment of the present invention is shown. In particular, the system provides global navigation satellite system (GNSS) based and inertial-based determination of vehicle position, velocity, orientation (attitude) and angular rate. Inertial sensors are co-located with GNSS antennas to more accurately derive the desired position and rate information.

It is noted that, while in exemplary embodiments, the GNSS receives positioning signals from the Global Positioning System (GPS), the system may be used with other radio based positioning or navigation systems, such as the GLONASS system, Galileo, or other systems such as pseudolites, low earth orbiting satellites (LEO), geosynchronous satellites, etc.

In the embodiment illustrated, the navigation-positioning system 201 includes a plurality of antenna units embodied as integrated GNSS Antenna-Inertial Sensing Units (GA-ISU) 206a-206d. As will be explained in greater detail below, each GA-ISU 206a-206d combines one or more GNSS antenna elements for receiving GNSS signals with an inertial sensor for determining, e.g., vehicle position, velocity, orientation (attitude) and angular rate. It is noted that while four such units are shown, in practice the number may vary. Each GA-ISU 206a-206d is coupled to a GNSS Receiver-Inertial Measurement Unit (GPS-IMU) processor 202. The GPS-IMU processor 202 receives the GNSS antenna sensor data and the inertial sensor data, which it processes to derive the desired position, velocity, orientation and angular rate information. The resulting information is then provided to a navigation processor 203 for use, for example, in steering control or course guidance.

Figure 2B:
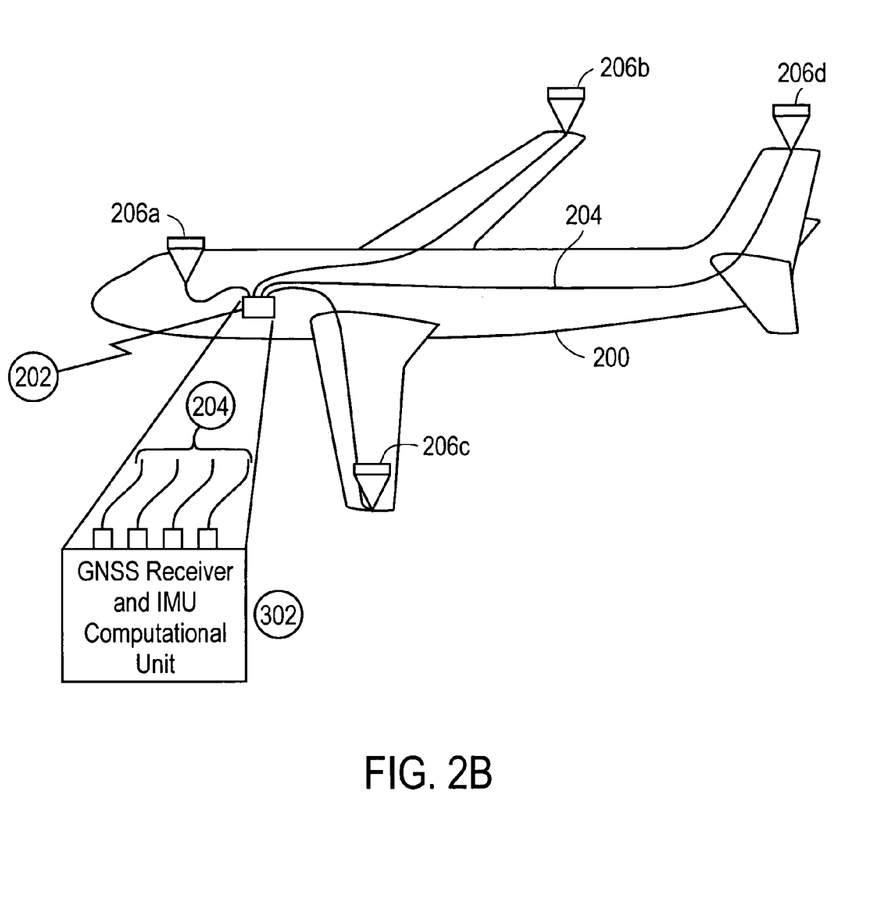
FIG. 2B illustrates an exemplary object employing a positioning-navigation system according to an embodiment of the present invention.

FIG. 2B illustrates typical vehicle topology for a positioning-navigation system according to embodiments of the present invention. In particular, shown is a vehicle 200, which may be embodied as an aircraft, although the invention is not so limited and may be implemented in any body whose position, orientation, flexibility, etc., is desired to be determined. For example, the body may be a substantially rigid body; a substantially flexible body; or a plurality of substantially rigid, connected, bodies articulated (or independently moving) with respect to one another. A body may be considered to be flexible if due to structural flexibility, relative motion between affixed antennas of greater than one tenth of the highest frequency GNSS carrier wavelength is possible during operation. Otherwise, a body may be considered to be rigid.

The GPS-IMU 202 and GA-ISU's 206a-206d are fixed in suitable locations of the vehicle 200. Typically, the GPS-IMU 202 is coupled via one or more coaxial cables 204 to the GA-ISUs 206a-206d. The coaxial cable 204 is used to provide power and may also be used to provide one or more bi-directional communication channels to the GA-ISUs 206a-206d.

Figure 3A:
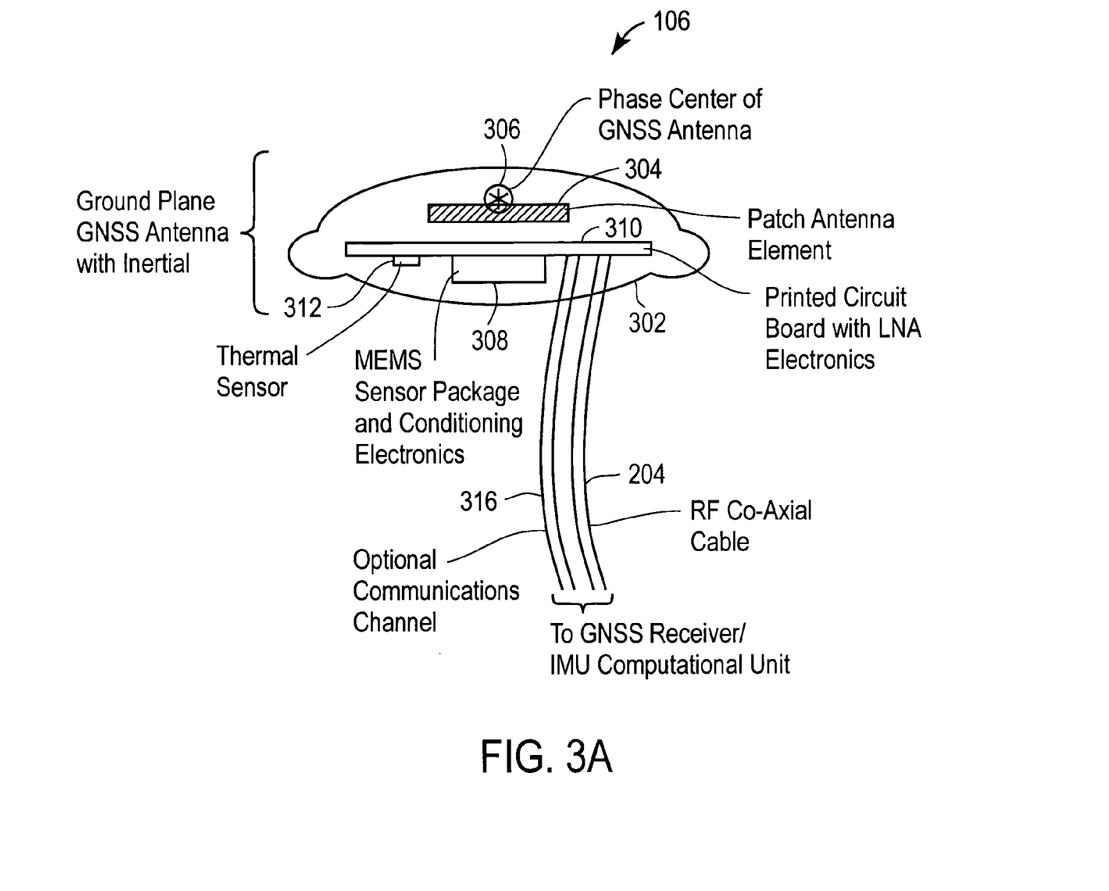
FIG. 3A and FIG. 3B illustrate exemplary antenna units according to embodiments of the present invention.
Figure 3B:
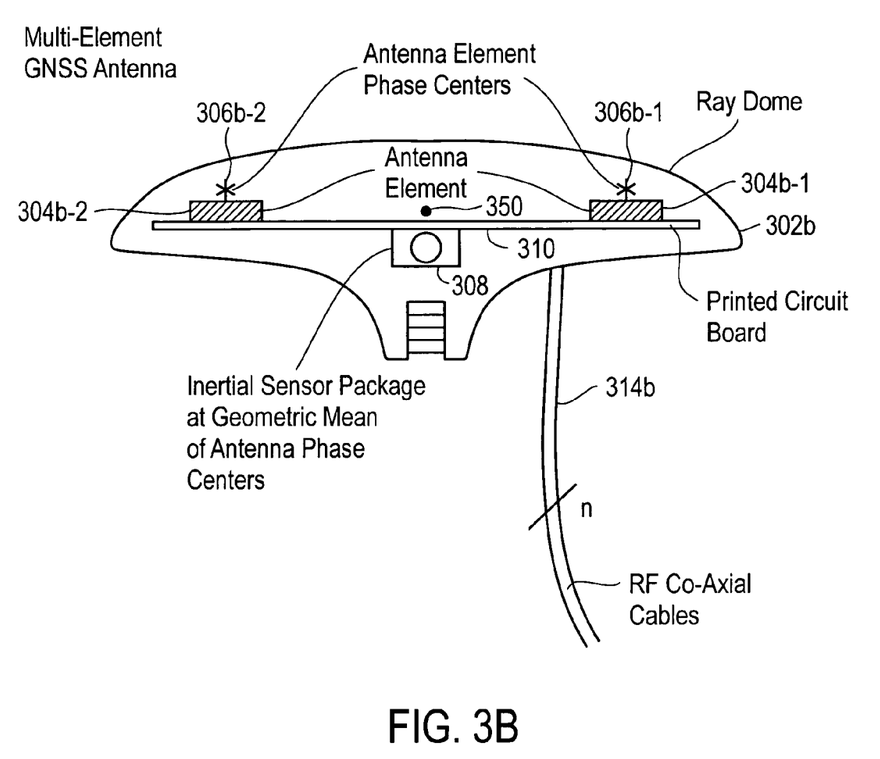

As noted above, the GA-ISUs 206a-206d are implemented to include one or more antenna elements integrated with one or more inertial sensing units. Exemplary GA-ISUs 206 are shown in FIG. 3A and FIG. 3B. In particular, GA-ISUs 206 according to embodiments of the present invention include inertial sensing units distributed to reside in close proximity to the phase center of the antenna unit. In embodiments in which a single antenna element is used, the phase center of the antenna unit is the phase center of the single element. In embodiments in which a plurality of elements are provided, the phase center is the geometric mean of the plurality of antenna elements. Thus, the inertial sensing reference is coincident with the GNSS sensing reference.

In the embodiment of the present invention shown in FIG. 3A, various components of the GA-ISU 106 are mounted on a printed circuit board 310 to which are mounted an inertial sensing unit 308, which may be implemented as a micro-electro-mechanical (MEMs) inertial sensing unit, and associated conditioning electronics. The inertial sensing unit 308 may be configured, for example, to provide three independent axes of acceleration and three independent axes of angular rate sensing. Suitable inertial sensing units are known and may include, for example, angular gyros, accelerometers. Additional sensors such as barometric, temperature or magnetic sensors may also be included.

An antenna element 304 is provided in close proximity to the inertial sensing unit 308. In particular, the phase center 306 of the antenna element 304 is substantially co-located with, or substantially adjacent, the inertial sensing unit 308, for example, "substantially adjacent" means within no more than one-half wavelength of the highest frequency GNSS carrier frequency. In the case of GPS, the highest frequency is 1575.42 MHz, yielding a wavelength of 19.2 cm. More preferably, the inertial sensing unit 308 is no more than one-eighth to one-quarter wavelength from the phase center 306 and, in embodiments employing the GPS system, the phase center 306 and inertial sensing unit are most preferably within one centimeter of each other. In one embodiment, the inertial sensing unit 308 may be positioned on the opposite side of the printed circuit board 310 from the antenna element 304.

Thus, the inertial sensing components are distributed to the GNSS antenna units, where they directly measure the inertial environment of the antenna phase center. Low noise amplification (LNA) electronics (not shown) may be provided in the housing 302, typically coupled to the board 310. Each GA-ISU 206 may further include a temperature sensor 312 to calibrate the repeatable thermal effects on the sensor package.

Also shown is an RF coaxial cable 204 for coupling the GA-ISU 206 to the GPS-IMU controller 202 (FIG. 2A). In addition, certain embodiments may also be provided with a separate communications channel 316, for transmission of inertial sensor signals, as will be explained in greater detail below.

The output of the GA-ISU 206 is communicated to the GPS-IMU processor 202 where it is combined with measurement data from the GNSS antenna(s). In one embodiment, the RF coaxial cable 204 itself is used to transmit both the GNSS sensor data and the inertial sensor data. For example, the inertial sensor signals may be modulated onto the cable using any of a variety of known modulation techniques, such as TDMA, CDMA, FDMA, etc. These signals are demodulated at the GPS-IMU 202 and processed with the GNSS phase data.

An alternate embodiment of a GA-ISU suitable for use in a positioning-navigation system according to embodiments of the present invention is shown in FIG. 3B. FIG. 3B illustrates GA-ISU 206-1 having multiple antenna elements 304b-1, 304b-2. In particular, shown is an antenna inside of which is positioned a rigid printed circuit board 310b, having inertial sensing unit 308b. In addition, as noted above, multiple antenna elements 304b-1, 304b-2 are mounted on the printed circuit board 310b. The antenna elements 304b-1, 304b-2 are typically mounted in a symmetrical pattern such that the inertial sensor package 308b may be mounted substantially at the geometric mean 350 of the phase centers 306b-1, 306b-2 of the antenna elements 304b-1, 304b-2. Rigidity of the printed circuit board is important to maintain the relative positioning of the attached antenna elements. Again, "substantially at" the geometric mean refers to placement within no more than one-half wavelength of the highest frequency GNSS carrier frequency. More preferably, the inertial sensing unit 308b is no more than one-eighth to one-quarter wavelength from the phase center 306 and, in embodiments employing the GPS system, the phase center 306 and inertial sensing unit are most preferably within one centimeter of the antenna unit phase center, i.e., the geometric mean 350 of the antenna element phase centers. It is noted, however, that other embodiments of the present invention may include multiple GNSS antenna elements associated in a same antenna unit with multiple, typically non-redundant, inertial sensor units 308b. An inertial sensor unit is associated with an antenna unit if the relative motion of the inertial sensor unit and the antenna unit are substantially constrained by rigid body dynamics to within a fraction of a carrier cycle.

Figure 4:
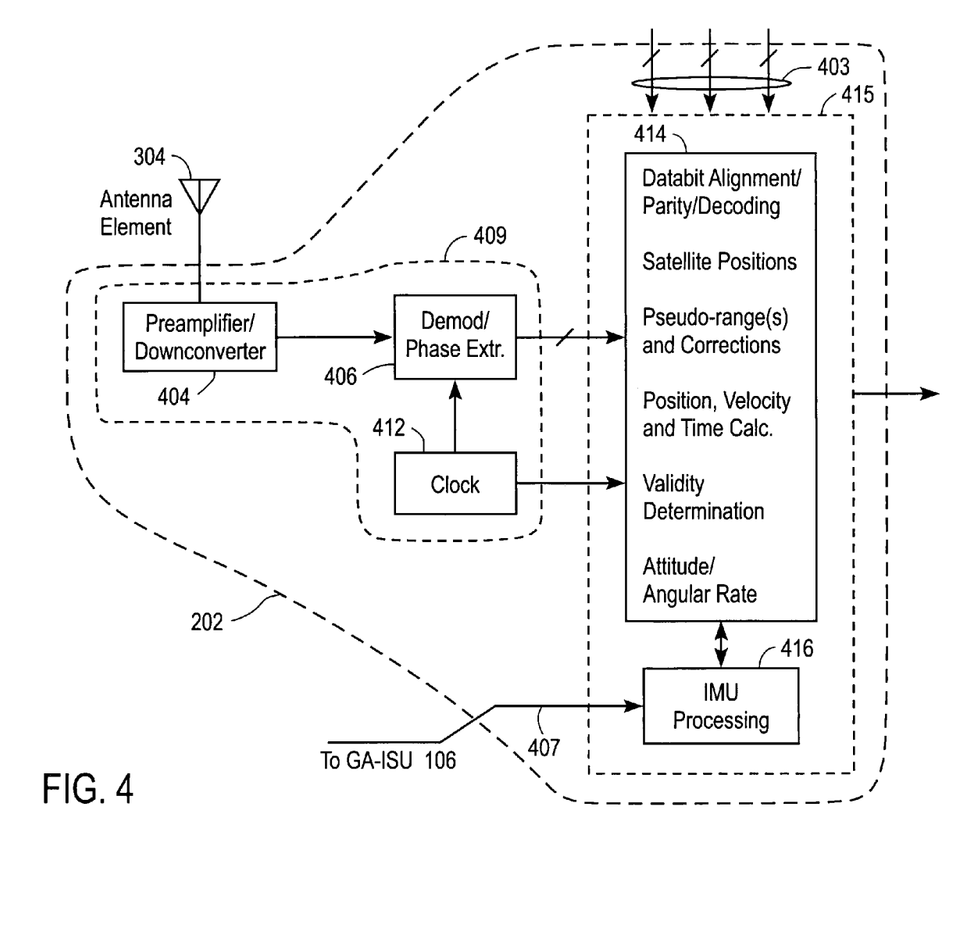
FIG. 4 is a block diagram of an exemplary processing unit according to an embodiment of the present invention.

An exemplary GNSS Receiver-Inertial Measurement Unit (GPS-IMU) controller 202 according to an embodiment of the invention is shown in FIG. 4. In the embodiment illustrated, GPS-IMU 202 receives GNSS signals and inertial measurement signals from the various GA-ISUs 206a-206d, respectively. For sake of simplicity, only one input channel 409 is shown in FIG. 4, it being understood that inputs from the remaining GA-ISU units are handled similarly (These are represented in FIG. 4 by reference numeral 403). Thus, the GPS-IMU 202 is coupled to receive GNSS signals from the antenna 304. The GPS-IMU 202 also receives the inertial measurement signals via a communications channel 407. As noted above, an RF coaxial cable may be used to provide the channel.

The GNSS signals are provided to a preamplifier and downconverter 404, which receives a clock signal from clock oscillator 412. The signal is provided to a demodulator/phase extractor 406, where the signal is mixed down to reference frequency with locally generated C/A or P code and demodulated. Also, the carrier phase may be extracted. The results are provided to a processing unit 415. The processing unit 415 may be implemented as one or more suitably programmed processors or application specific integrated circuits (ASIC).

In the embodiment illustrated, the processing unit 415 includes a GNSS processing unit 414 and an IMU processing unit 416. The GNSS processing unit 414 receives the GNSS message(s), code measurement(s) and time measurement(s) from the various input channels. From these, the GNSS signal processing unit 414 can perform data decoding, determination of satellite positions, pseudo-range calculations, and make determinations of receiver position, velocity and time. An exemplary system and method for handling GPS signals is described in copending, commonly-assigned U.S. patent application Ser. No. 10/408,496, titled "Satellite Navigation System Using Multiple Antennas," which is hereby incorporated by reference in its entirety as if fully set forth herein.

From the data from the multiple sensors, the GNSS signal processing unit 414 can also determine attitude and angular velocity. The GNSS signal processing unit 414 can also operate in conjunction with the IMU processing unit 416 to make inertial-based corrections of the GNSS position, etc., determinations.

Thus, as noted above, the IMU processing unit 416 receives, e.g., accelerometer and angular-rate sensor data from the GA-ISUs 106. This data can be used to make independent measurements of changes in vehicle position, velocity, attitude and angular rate, or can be used in conjunction with the corresponding GNSS data to make an "enhanced" determination.

For example, the GNSS signal processing unit 414 can determine if the received GNSS data is valid; if the GNSS data from one or more of the GNSS channels is missing or corrupted (e.g., due to carrier phase cycle slip), then data from the inertial sensors can be used. Alternatively, the data from the inertial sensors can be used to calibrate the GNSS. Similarly, if the data from the inertial sensing units is determined to be invalid, then GNSS data can be used.

Figure 5:
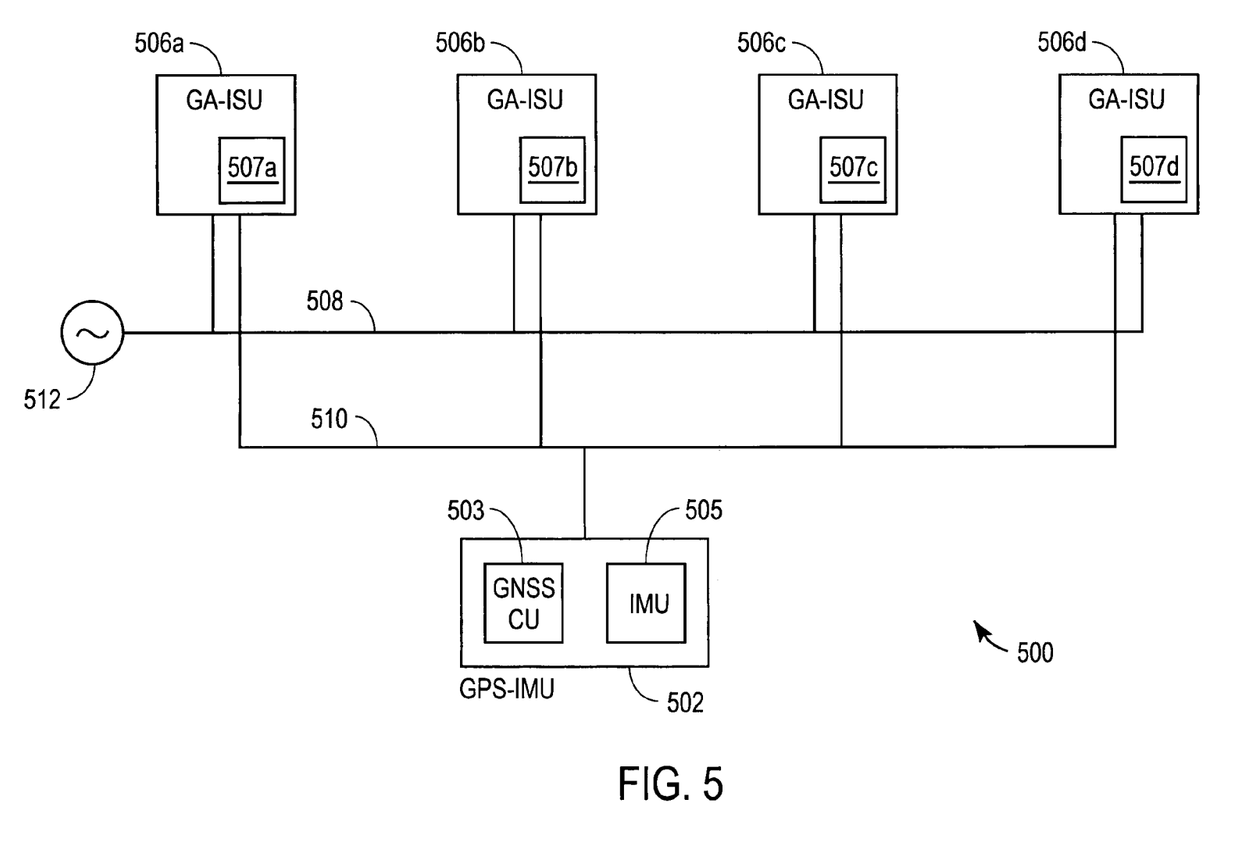
FIG. 5 is a block diagram of an exemplary positioning and navigation system in accordance with an embodiment of the invention.

An alternate embodiment of a positioning-navigation system according to the present invention is shown in FIG. 5. In particular, in the system 500 of FIG. 5, the GNSS receiver portion of the GPS-IMU 202 (FIG. 4) is divided into a computational unit 503 and a plurality of signal tracking units 507a-507d, distributed with the GA-ISUs 506a-506d.

In this embodiment, the GPS-IMU 502 includes an IMU processor 505 similar to that of the GPS-IMU 202 of FIG. 2, and a GNSS computational unit 503. In addition, an external reference oscillator 512 may be provided that provides a common clock signal to the GA-ISUs 506. In other embodiments, the reference oscillator may be on-board the GPS-IMU 502

Figure 6:
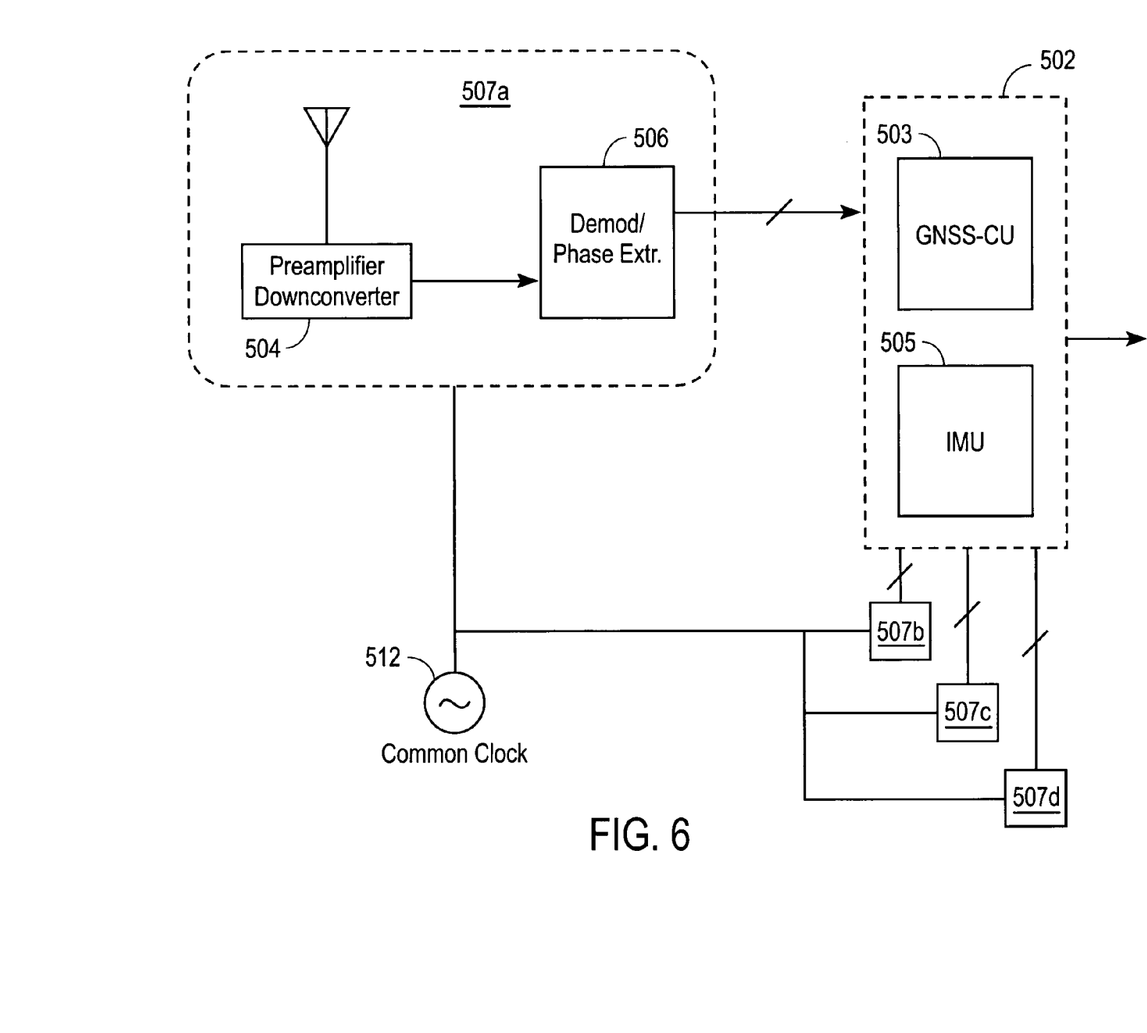
FIG. 6 is a block diagram of an exemplary processing unit according to an embodiment of the present invention.

FIG. 6 is a block diagram illustrating the GNSS receiver of the embodiment of FIG. 5 in greater detail. Shown are a plurality of signal tracking units 507a-507d, which are distributed in the various GA-ISUs 506a-506d; for sake of simplicity, only signal tracking unit 507a will be discussed. The signal tracking units 507 include preamplifier and downconverter 504 and demodulation/carrier phase extracting unit 506. In addition, a common clock 512 is provided. As noted above, the common clock signal may be provided from a separate clock oscillator 512, or from one on-board the GPS-IMU 502.

The resulting navigation message and code measurement signals are provided to the computational unit 503 on the GPS-IMU 402. The computational unit 503 then processes the GNSS information along with the received IMU information to generate position, velocity, etc., information for use by the navigation system.

Figure 7:
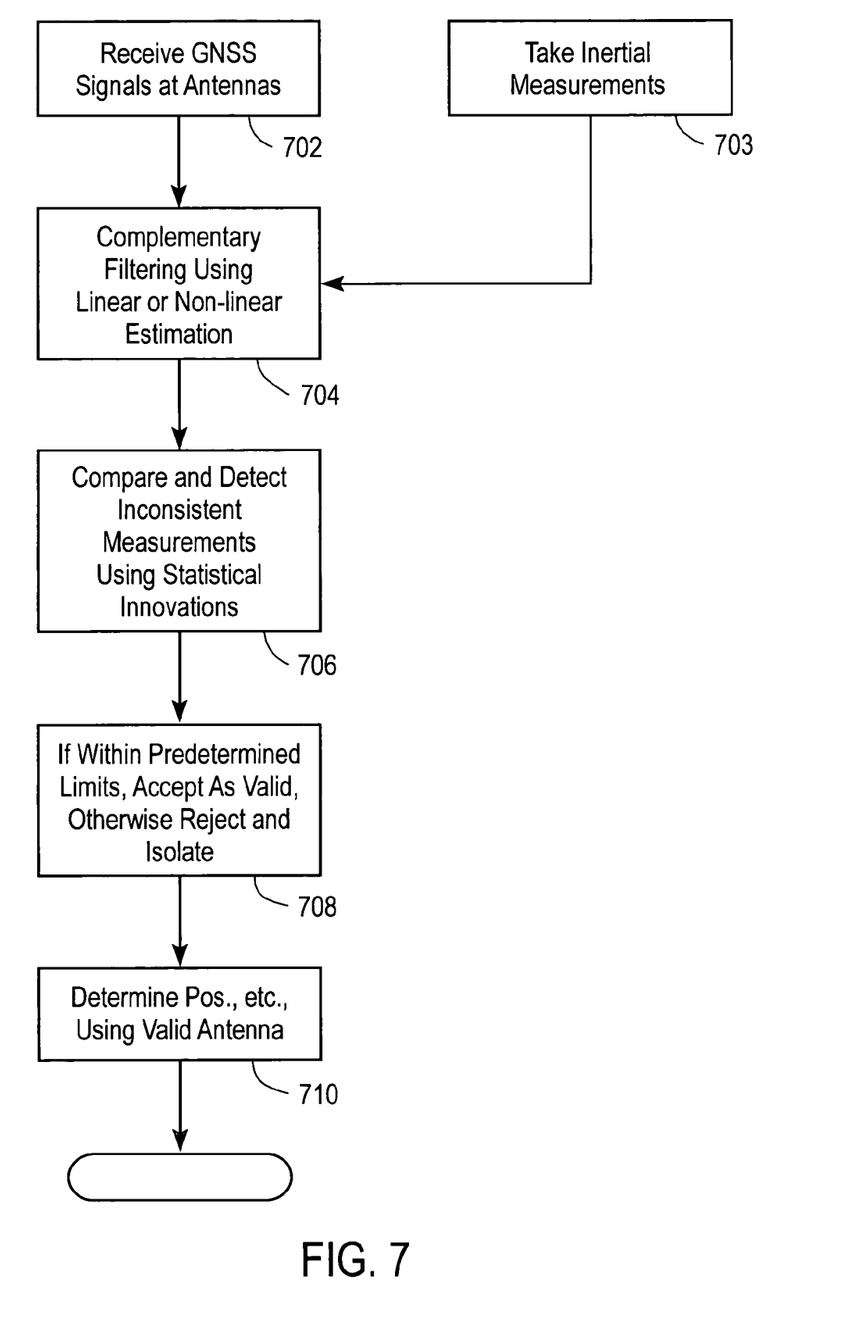
FIG. 7 is a diagram illustrating operation of an embodiment of the present invention.

Turning now to FIG. 7, a diagram illustrating operation of an embodiment of the present invention is shown. Initially, at a step 702, GNSS signals are received at one or more antennas. Inertial measurements, using inertial sensing units at the antennas, are obtained in step 703. In a step 704, GNSS and inertial measurement units are used in a complementary filtering algorithm, typically based on statistical least squares estimation such as a linear or nonlinear Kalman filter, to update a state vector estimate. The state vector will vary with the application depending on the configuration and flexibility of the vehicle, the number of attached GA-IMU's and other details of the physical modeling. The filter implementation also provides the ability to compare inertially-derived and GNSS-derived measurements using statistical innovations as shown in step 706. In a step 708, the statistical innovations are compared within predetermined or statistically defined limits, allowing the acceptance or rejection of the measurement set. If the values are outside the limit(s), then value(s) from the particular device may be determined to be invalid. For example, a value may be determined to be invalid if the particular device (i.e., antenna or inertial sensor) is not functioning or gives inconsistent measurements. In other cases, for example, in the event a carrier phase cycle slip is detected, the GNSS measurement may be determined to be invalid or a cycle slip may be repaired. Alternatively, the rejected device may then be isolated and its values not used for further determinations. Valid values are then used, in step 710, to derive velocity, attitude, angular rate, etc. Additional embodiments of the invention may be employed to determine flexibility of the body to which the antenna units are attached. For example, flexure of an aircraft wing by sensing relative motion among a set of antenna attached units.

The foregoing description of the invention has been presented for purposes of illustration and description. It is not intended to be exhaustive or to limit the invention to the precise form disclosed, and modifications and variations are possible in light of the above teachings or may be acquired from practice of the invention. The drawings and description were chosen in order to explain the principles of the invention and its practical application. The drawings are not necessarily to scale and illustrate the device in schematic block format. It is intended that the scope of the invention be defined by the claims appended hereto, and their equivalents

What is claimed is:

1. A global navigation satellite system (GNSS) receiver system associated with an object, comprising:
    a processing unit; and
    a plurality of antenna units for receiving GNSS signals, each of the antenna units including an antenna element, each of said antenna elements having a phase center;
    one or more inertial sensor units each positioned substantially adjacent said phase centers; and
    at least one communication channel between each antenna unit and said processing unit.

2. A GNSS receiver system in accordance with claim 1, wherein said processing unit determines at least one of a position, velocity, orientation, or angular rate of said object.

3. A GNSS receiver system in accordance with claim 1, wherein said processing unit uses data from said plurality of antenna units and data from said one or more inertial sensor units to determine at least one of a position, velocity, orientation, or angular rate of said object.

4. A GNSS receiver system in accordance with claim 3, wherein said plurality of antenna units includes GNSS signal tracking unit and a means for receiving an external reference signal.

5. A GNSS receiver system in accordance with claim 4, further comprising an external reference oscillator, wherein said external reference oscillator delivers a common reference signal to one or more of said antenna units.

6. A GNSS receiver system in accordance with claim 1, further comprising one or more RF coaxial cables coupling said processing unit and said plurality of antenna units, said processing unit further comprising a power supply, said one or more RF coaxial cables providing power to said plurality of antenna units.

7. A GNSS receiver system in accordance with claim 1, wherein inertial measurement data are transmitted via said at least one communications channel in at least one of analog or digital form.

8. A GNSS receiver system in accordance with claim 7, wherein an RF coaxial cable is used as said at least one communications channel.

9. A GNSS receiver system in accordance with claim 8, wherein GNSS data and inertial measurement data are transmitted from said plurality of antenna units using at least one of EDMA, TDMA or COMA modulation.

10. A GNSS receiver system in accordance with claim 7, wherein said at least one communications channel is bidirectional.

11. A GNSS receiver system in accordance with claim 3, wherein said object is substantially rigid.

12. A GNSS receiver system in accordance with claim 3, wherein said output of said plurality of antenna units and said output of said one or more inertial units are used for component level failure detection and isolation.

13. A GNSS receiver system in accordance with claim 3, wherein said output of said plurality of antenna units and said output of said one or more inertial units are used for GNSS carrier phase cycle slip detection and isolation.

14. A GNSS receiver system in accordance with claim 3, wherein said object comprises a plurality of substantially rigid bodies, articulated with respect to each other.

15. A GNSS receiver system in accordance with claim 3, wherein said object is substantially flexible.

16. A GNSS receiver system in accordance with claim 15, wherein said plurality of antenna units are used to determine flexibility of said oblect.

17. A GNSS receiver system in accordance with claim 3, wherein said object comprises a plurality of substantially rigid bodies.

18. A GNSS receiver system in accordance with claim 17, wherein said plurality of antenna units are attached to each of said substantially rigid bodies.

19. An antenna unit for use in a global navigation satellite system (GNSS) receiver, comprising:
  a GNSS antenna element having a phase center and a downconverter for receiving GNSS signals from the GNSS antenna element;
  an integrated inertial sensor unit positioned substantially adjacent said phase center.

20. An antenna unit in accordance with claim 19, further comprising a communication channel interface for interfacing inertial measurements from said integrated inertial sensor unit to an external processing unit.

21. An antenna unit in accordance with claim 20, wherein said inertial measurements are provided in at least one of an analog or digital format.

22. An antenna unit in accordance with claim 20, wherein said communication channel interface comprises an RF coaxial cable interface, said RF coaxial cable interface configured to receive GNSS signals from said GNSS antenna element.

23. An antenna unit in accordance with claim 22, wherein said RF coaxial cable interface further comprises a power supply interface for powering said antenna unit.

24. An antenna unit in accordance with claim 22, further including a modulation unit for modulating said GNSS measurements and said inertial measurements to said RF coaxial cable interface using at least one of TDMA, CDMA, or FDMA modulation.

25. An antenna unit in accordance with claim 19, further including a GNSS signal tracking unit.

26. An antenna unit in accordance with claim 25, further including a reference oscillator interface for receiving an external reference oscillator signal.

27. A sensing method for use in a vehicle, comprising:
  transmitting inertial sensor signals and global network satellite system (GNSS) signals from a plurality of integrated inertial-GNSS sensing units to a processing unit, the plurality of integrated-inertial GNSS sensing units comprising an antenna element having a phase center and an inertial measurement unit positioned substantially adjacent said phase center; and
  using said inertial sensor signals and said GNSS signals at said processing unit to determine one or more of a position, velocity, orientation or angular rate of said vehicle.

28. A sensing method in accordance with claim 27, wherein said transmitting inertial sensor signals comprises transmitting via a communications channel in an analog or digital form.

29. A position, velocity, orientation or angular rate-sensing method in accordance with claim 28, wherein said communications channel comprises an RF coaxial cable and further comprising providing power from said processing unit to said at least one inertial measurement units via said RF coaxial cable.

30. A sensing method in accordance with claim 29, wherein said transmitting comprises transmitting said inertial sensor signals and global network satellite system (GNSS) signals via said RF coaxial cable using at least one of TDMA, FDMA, or CDMA techniques.

31. A sensing method in accordance with claim 27, further comprising executing GNSS signal tracking processing at said plurality of integrated inertial-GNSS sensing units and providing an external reference oscillator signal to at least one of said integrated inertial-GNSS sensing units.

32. A sensing method in accordance with claim 27, further comprising executing GNSS signal tracking processing at said plurality of integrated inertial-GNSS sensing units and providing a common external reference oscillator signal to a plurality of said integrated inertial-GNSS sensing units.

33. A method in accordance with claim 27, further comprising using said processing unit to determine flexibility of a body to which said plurality of integrated inertial-GNSS sensing units are attached.

34. A method in accordance with claim 27, further comprising said processing unit using inertial sensor signals from said inertial measurement unit and global network satellite system (GNSS) signals from said antenna element to detect failure of all other of said antenna elements and said inertial measurement units, respectively.

35. A method in accordance with claim 34, further comprising the step of isolating any said antenna element or said inertial measurement unit for which failure was detected.

36. A method in accordance with claim 34, further comprising the steps of GNSS carrier phase cycle slip detection and isolation.

37. A global navigation satellite system (GNSS) receiver system associated with an object, comprising:
  a processing unit; and
  one or more antenna units for receiving GNSS signals, each of the antenna units having a phase center;
  one or more inertial sensor units each positioned substantially adjacent said phase centers; and
  at least one communication channel between each antenna unit and said processing unit;
  wherein an antenna unit comprises a plurality of antenna elements mounted on a rigid substrate.

38. A GNSS receiver system in accordance with claim 37, wherein an antenna unit phase center comprises a phase center of a single antenna element.

39. A GNSS receiver system in accordance with claim 37, wherein said processing unit determines at least one of a position, velocity, orientation, or angular rate of said object.

40. A GNSS receiver system in accordance with claim 37, wherein said processing unit uses data from said one or more antenna units and data from said one or more inertial sensor units to determine at least one of a position, velocity, orientation, or angular rate of said object.

41. A GNSS receiver system in accordance with claim 40, wherein each of said one or more antenna units includes GNSS signal tracking unit and a means for receiving an external reference signal.

42. A GNSS receiver system in accordance with claim 41, further comprising an external reference oscillator, wherein said external reference oscillator delivers a common reference signal to each of said one or more antenna units.

43. A GNSS receiver system in accordance with claim 37, further comprising an RF coaxial cable coupling said processing unit and said one or more antenna units, said processing unit further comprising a power supply, said RF coaxial cable providing power to said one or more antenna units.

44. A GNSS receiver system in accordance with claim 37, wherein inertial measurement data are transmitted via said at least one communications channel in at least one of analog or digital form.

45. A GNSS receiver system in accordance with claim 44, wherein said RF coaxial cable is used as said at least one communications channel.

46. A GNSS receiver system in accordance with claim 45, wherein GNSS data and inertial measurement data are transmitted from said one or more antennas units using at least one of FDMA, TDMA or CDMA modulation.

47. A GNSS receiver system in accordance with claim 46, wherein said at least one communications channel is bidirectional.

48. A GNSS receiver system in accordance with claim 37, wherein said object is substantially rigid.

49. A GNSS receiver system in accordance with claim 39, wherein said output of said one or more antenna units and said output of said one or more inertial units are used for component level failure detection and isolation.

50. A GNSS receiver system in accordance with claim 39, wherein said output of said one or more antenna units and said output of said one or more inertial units are used for GNSS carrier phase cycle slip detection and isolation.

51. A GNSS receiver system in accordance with claim 39, wherein said object comprises a plurality of substantially rigid bodies, articulated with respect to each other.

52. A GNSS receiver system in accordance with claim 39, wherein said object is substantially flexible.

53. A GNSS receiver system in accordance with claim 52, wherein said one or more antenna units are used to determine the flexibility of said object.

54. A GNSS receiver system in accordance with claim 39, wherein said object comprises a plurality of substantially rigid bodies.

55. A GNSS receiver system in accordance with claim 54, wherein said one or more antenna units is attached to each of said substantially rigid bodies.

56. An antenna unit for use in a global navigation satellite system (GNSS) receiver, comprising an integrated inertial sensor unit positioned substantially adjacent a phase center of said antenna unit, wherein said phase center comprises a geometric mean of phase centers of a plurality of antenna elements.

57. An antenna unit in accordance with claim 56, further comprising a communication channel interface for interfacing inertial measurements from said integrated inertial sensor unit to an external processing unit.

58. An antenna unit in accordance with claim 57, wherein said inertial measurements are provided in at least one of an analog or digital format.

59. An antenna unit in accordance with claim 57, wherein said communication channel interface comprises an RF coaxial cable interface, said RF coaxial cable interface configured to receive GNSS measurements from said GNSS antenna element.

60. An antenna unit in accordance with claim 59, wherein said RF coaxial cable interface further comprises a power supply interface for powering said antenna unit.

61. An antenna unit in accordance with claim 59, further including a modulation unit for modulating said GNSS measurements and said inertial measurements to said RF coaxial cable interface using at least one of TDMA, CDMA, or FDMA modulation.

62. An antenna unit in accordance with claim 56, further including a GNSS signal tracking unit.

63. An antenna unit in accordance with claim 62, further including a reference oscillator interface for receiving an external reference oscillator signal.

64. A sensing method for use in a vehicle, comprising:
transmitting inertial sensor signals and global network satellite system (GNSS) signals from at least one integrated inertial-GNSS sensing unit to a processing unit, the at least one integrated-inertial GNSS sensing unit having a phase center and an inertial measurement unit positioned substantially adjacent said phase center;
using said inertial sensor signals and said GNSS signals at said processing unit to determine one or more of a position, velocity, orientation or angular rate of said vehicle; and
wherein said phase center comprises a geometric mean of a phase center of a plurality of antenna elements.

65. A sensing method in accordance with claim 64, wherein said transmitting inertial sensor signals comprises transmitting via a communications channel in an analog or digital form.

66. A position, velocity, orientation or angular rate-sensing method in accordance with claim 64, wherein said communications channel comprises an RF coaxial cable and further comprising providing power from said processing unit to said at least one inertial measurement units via said RF coaxial cable.

67. A sensing method in accordance with claim 65, wherein said transmitting comprises transmitting said inertial sensor signals and global network satellite system (GNSS) signals via said RF coaxial cable using at least one of TDMA, FDMA, or CDMA techniques.

68. A sensing method in accordance with claim 64, further comprising executing GNSS signal tracking processing at said at least one integrated inertial-GNSS sensing unit and providing an external reference oscillator signal to said at least one integrated inertial-GNSS sensing unit.

69. A sensing method in accordance with claim 64, further comprising executing GNSS signal tracking processing at said at least one integrated inertial-GNSS sensing unit and providing a common external reference oscillator signal to a plurality of said at least one integrated inertial-GNSS sensing units.

70. A method in accordance with claim 64, further comprising using said processing unit to determine flexibility of a body to which said at least one integrated inertial-GNSS sensing unit is attached.

71. A method in accordance with claim 64, further comprising said processing unit using inertial sensor signals from said inertial measurement unit and global network satellite system (GNSS) signals from said antenna element to detect failure of all other of said antenna units and said inertial measurement units, respectively.

72. A method in accordance with claim 71, further comprising the step of isolating any said antenna unit or said inertial measurement unit for which failure was detected.

73. A method in accordance with claim 71, further comprising the step of detection and isolation of GNSS carrier phase cycle slip detection and isolation.

74. A global navigation satellite system (GNSS) receiver system comprising:
a processing unit; and
a rulurality of antenna units for receiving GNSS signals, each of the antenna units including an antenna element, each of said antenna elements having a phase center;
a reference oscillator shared among all antenna units;

a plurality of inertial sensor units each associated with at least one of the antenna units and each substantially adjacent a corresponding phase center; and at least one communication channel between each antenna unit and said processing unit;

at least one communication channel between each inertial sensor unit and said processing unit.

75. A GNSS receiver system in accordance with claim 74, wherein said inertial sensor units are substantially collocated with said GNSS antenna units.

76. A GNSS receiver system in accordance with claim 74, wherein said inertial units are mounted on several locations on a flexible body.

77. A GNSS receiver system in accordance with claim 74, wherein said inertial units are mounted on independently moving rigid bodies.

78. A GNSS receiver system in accordance with claim 74, wherein said inertial units are mounted on rigid bodies articulated with respect to each other.

79. A GNSS receiver system in accordance with claim 1, each of the antenna units including a downconverter for receiving GNSS measurements from antenna elements.

80. A method in accordance with claim 27, further including using a downconverter at said plurality of integrated inertial-GNSS sensing units to receive GNSS measurements.

81. A GNSS receiver system in accordance with claim 37, each of the antenna units including a downconverter for receiving GNSS measurements from antenna elements.

82. A method in accordance with claim 64, further including using a downconverter at said plurality of integrated inertial-GNSS sensing units to receive GNSS measurements.

83. A GNSS receiver system in accordance with claim 74, each of the antenna units including a downconverter for receiving GNSS measurements from antenna elements.

* * * * *